United States Patent
Dejuan et al.

(10) Patent No.: US 10,678,877 B2
(45) Date of Patent: Jun. 9, 2020

(54) SYSTEM AND METHODS FOR CREATING AUTOMATICALLY UPDATABLE WEBSITE METADATA CATALOG FOR SEARCH ENGINE OPTIMIZATION

(71) Applicant: NETSUITE INC., San Mateo, CA (US)

(72) Inventors: Pablo E. Dejuan, Montevideo (UY); Carlos F. Munoa, Montevideo (UY)

(73) Assignee: NETSUITE INC., San Mateo, CA (US)

(*) Notice: Subject to any disclaimer, the term of this patent is extended or adjusted under 35 U.S.C. 154(b) by 277 days.

(21) Appl. No.: 15/635,001

(22) Filed: Jun. 27, 2017

(65) Prior Publication Data

US 2018/0081976 A1 Mar. 22, 2018

Related U.S. Application Data

(60) Provisional application No. 62/395,858, filed on Sep. 16, 2016.

(51) Int. Cl.
*G06F 16/9535* (2019.01)
*G06Q 30/06* (2012.01)
*G06F 16/22* (2019.01)
*G06F 16/958* (2019.01)

(52) U.S. Cl.
CPC ......... *G06F 16/9535* (2019.01); *G06F 16/22* (2019.01); *G06F 16/958* (2019.01); *G06Q 30/0623* (2013.01)

(58) Field of Classification Search
CPC .... G06F 16/9535; G06F 16/22; G06F 16/958; G06Q 30/0623
See application file for complete search history.

(56) References Cited

U.S. PATENT DOCUMENTS

| | | | |
|---|---|---|---|
| 6,269,369 B1 * | 7/2001 | Robertson | G06Q 10/02 |
| 6,810,405 B1 * | 10/2004 | LaRue | A61M 19/00 |
| | | | 707/613 |
| 8,452,748 B1 * | 5/2013 | Pugh | G06Q 10/101 |
| | | | 707/706 |
| 2006/0265368 A1 * | 11/2006 | Nickerson | G06F 16/958 |
| 2009/0216760 A1 * | 8/2009 | Bennett | G06F 16/951 |
| 2011/0060788 A1 | 3/2011 | Haybi et al. | |
| 2012/0331016 A1 * | 12/2012 | Janson | G06F 16/25 |
| | | | 707/809 |

(Continued)

*Primary Examiner* — Cam Y T Truong
(74) *Attorney, Agent, or Firm* — Kraguljac Law Group, LLC

(57) ABSTRACT

A system and method for creating an automatically updatable Website metadata catalog for search engine optimization are disclosed. In one embodiment, a system and method may be directed to defining a metadata formula for a Website using parameters by an application server and storing the metadata formula in a database communicatively connected to the application server. When a Web server receives a search request for the Website via a search engine through a Web server, the metadata formula for the Website is validated using a cache memory of the database so that the metadata formula is automatically updated as a search is initiated. In some embodiments, the validation of the metadata formula can be done based on changes in the content of the Website.

17 Claims, 8 Drawing Sheets

(56) References Cited

U.S. PATENT DOCUMENTS

| | | | |
|---|---|---|---|
| 2013/0073473 A1* | 3/2013 | Heath | G06Q 30/02 705/319 |
| 2014/0051383 A1* | 2/2014 | Doerr | H04W 4/16 455/405 |
| 2014/0173744 A1* | 6/2014 | Borohovski | G06F 21/577 726/25 |
| 2014/0289070 A1* | 9/2014 | Copley | G06Q 50/16 705/26.7 |
| 2015/0019480 A1* | 1/2015 | Maquaire | G06F 16/252 707/609 |
| 2015/0286816 A1* | 10/2015 | Adler | G06F 21/45 726/6 |
| 2018/0150869 A1* | 5/2018 | Finnegan | G06Q 30/0239 |

* cited by examiner

SYSTEM AND METHODS FOR CREATING AUTOMATICALLY UPDATABLE WEBSITE METADATA CATALOG FOR SEARCH ENGINE OPTIMIZATION

CROSS REFERENCE TO RELATED APPLICATION

This application claims the benefit of U.S. Provisional Application No. 62/395,858, entitled "System and Methods for Defining Search Engine Optimization Formulae to Automatically Create Website Data," filed Sep. 16, 2016, which is incorporated herein by reference in its entirety (including the Appendix) for all purposes.

BACKGROUND

Search engines utilize information related to (or associated with) Websites to generate a list of search results by matching or otherwise comparing that information to search terms or keywords provided by a user. The information about or associated with a Website is derived from one or more of the webpage contents, HTML tags, or other data associated with a Website or webpage, and is typically referred to as metadata. Because metadata related to a Website or webpage is communicated to and used by search engines, it has been found that the metadata may be used to improve the accuracy of the search results produced by the search engines, and such techniques are often referred to as search engine optimization (SEO).

To obtain the "best" search results (i.e., results having the greatest likelihood of being of value to a user in terms of identifying a Website or webpage of potential interest), it has been found to be desirable to construct a "catalog" of the metadata manually, thereby reflecting attributes of the contents of the Website or webpage; for example, for an eCommerce platform Website or webpage, these attributes may include brands, colors, styles, and apparel sizes. The metadata may then be subjected to further evaluation or processing, such as by a curation process or operation. However, changes to the Website contents (as may arise due to sales, promotions, bundling of items, changes in availability, etc.) may not be reflected in the metadata unless the metadata catalog construction and curation are performed manually and at regular enough intervals (i.e., regularly enough to reflect the majority of the changes or those expected to be most significant). Unfortunately, in conventional systems and applications, the metadata regarding a Website tends to not accurately reflect the latest (most current) information regarding the Website and its contents (or at least the information that may be used to characterize a Website or webpage for purposes of responding to a search query) without the use of regular review and manual input. This means that the search results returned in response to a query or search may not be as complete or as accurate in the absence of manual curation or another form of regular updating. Further, unless the curation or updating is performed regularly and relatively frequently, some users may still receive stale search results, or at least sub-optimal results. This can be a serious problem; in the case of an eCommerce website, such a result may lead to missed sale opportunities and/or dissatisfied customers.

Embodiments of the inventive system and methods are directed to overcoming the limitations associated with conventional approaches to updating and maintaining Website or webpage metadata, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention provide improved assembly and construction of a Website metadata catalog, including the ability for automatic update capabilities by use of the inventive SEO formulae. The inventive SEO formulae and associated tool(s) described herein are able to more efficiently and effectively capture and reflect the current information in a Website or webpage and as a result, provide more accurate and up-to-date search results when accessed by search engines.

In one embodiment, the invention is directed to a method for creating an automatically updatable Website metadata catalog. A metadata formula for a Website is defined using parameters by an application server and the metadata formula is stored in a database communicatively connected to the application server. The metadata formula is automatically updated by the application server by retrieving the metadata formula associated to the Website from the database; comparing the parameters of the metadata formula with one or more attributes of the Website; automatically updating the metadata formula using at least one of the attributes of the Website, and maintaining the updated metadata formula for the Website in a cache memory.

In another embodiment, the invention is directed to a Website metadata catalog automatic updating system. The system includes an application server configured to define a metadata formula for a Website using parameters; a database communicatively connected to the application server configured to store the metadata formula; a Web server configured to receive a search request for the Website via a search engine and to evaluate the Website crawler; and a search engine optimization server configured to perform an automatic updating process of the metadata formula associated to the Website. The automatic updating process includes: (a) retrieving the metadata formula associated to the Website from the database; (b) comparing the parameters of the metadata formula with one or more product information of the Website; (c) automatically updating the metadata formula using at least one the product information of the Website; and (d) maintaining the updated metadata formula for the Website in the cache memory.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
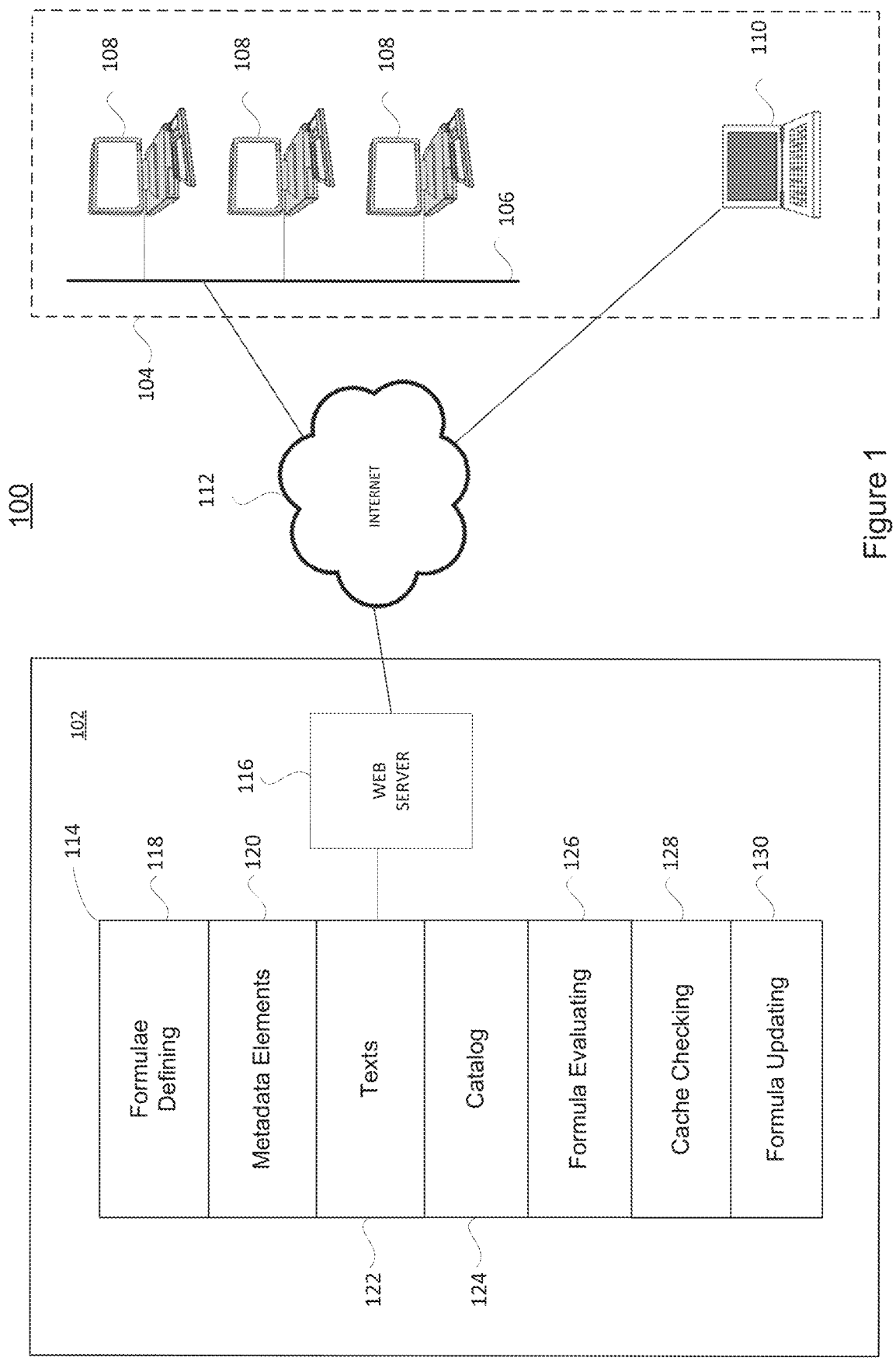
FIG. 1 is a diagram illustrating a system, including a Website SEO system and a user network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element (for example, a non-transitory computer readable medium). In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention provide a mechanism for improving the acquisition and/or construction of a metadata catalog relevant to a Website or webpage based on the inventive SEO formulae. In some embodiments, the innovative SEO formulae parameters are generated/created based on items/products associated with or displayed by the Website or webpage, and are automatically updated when the items/products of the Website are changed (or in some cases, when information about them is changed, such as their availability, description, price, etc.). Using an embodiment of the inventive system and methods, the metadata catalog relevant to a Website or webpage obtained by using the inventive SEO formulae can be automatically maintained and updated without manual construction or curation, and further, may be efficiently communicated to search engines to provide accurate and current (up-to-date) information about the Website or webpage.

Functionally, embodiments of the inventive system and methods provide an improvement to conventional solutions for SEO, and one that is compatible with a majority of the current search engine features or requirements, while also providing a foundation or architecture for implementing additional improvements to the process of metadata catalog construction and metadata catalog updating for Websites. The embodiments and functionality described herein include processes or operations for defining a metadata catalog with formulae for a Website based on the Website or webpage attributes, evaluating the formulae using outputs stored in a cache, and determining whether updates of the formulae are necessary based on a change to the attributes of the Website. For example, when a request for a search of Websites is made, a cache is checked and if elements of the metadata are available, then the metadata is retrieved from the cache; if one of the metadata elements is missing because the formula for the metadata was not evaluated, then the formula is evaluated and cached for enabling responses to further requests.

Figure 4A:
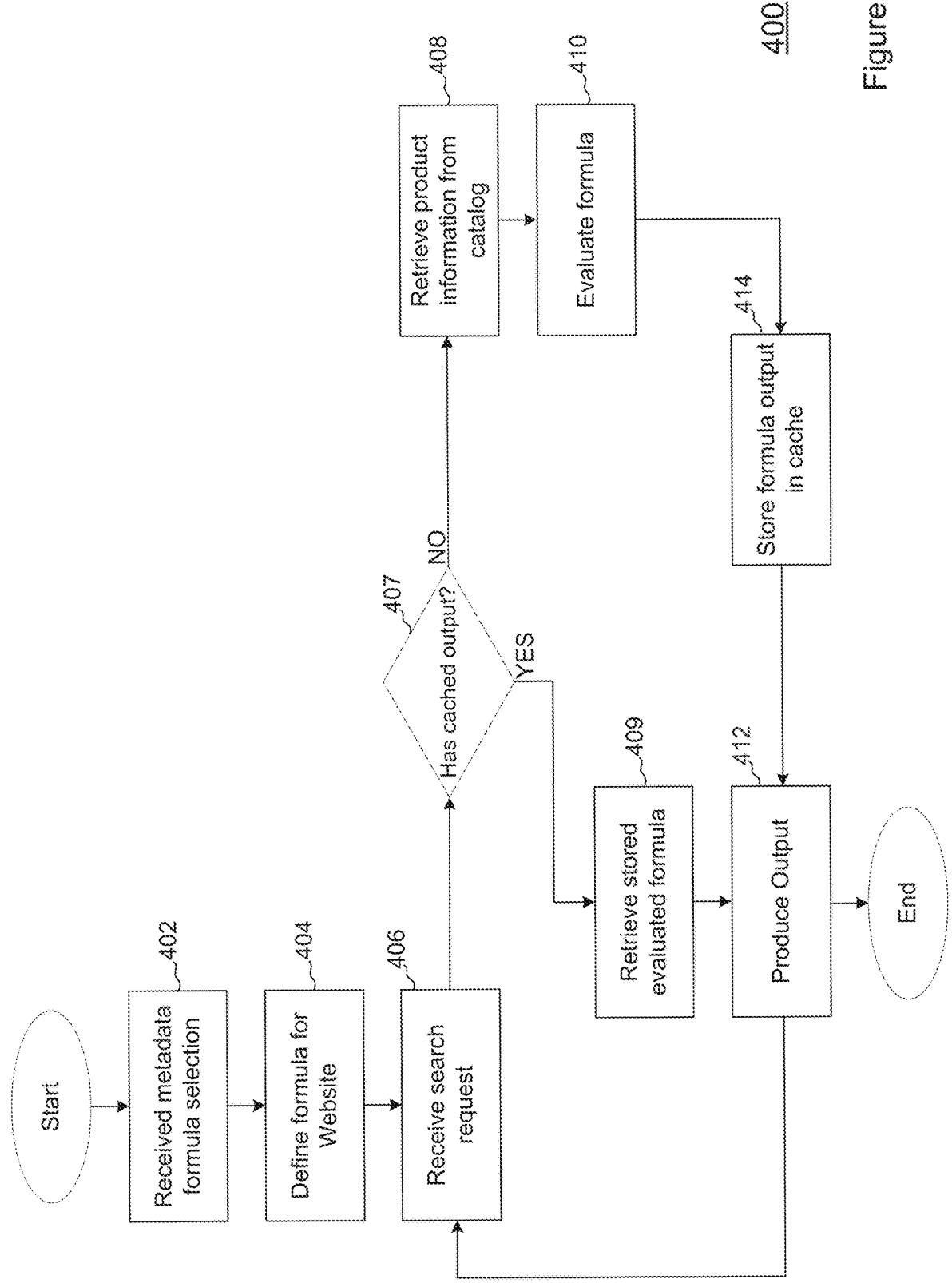
FIG. 4(a) is a flow chart illustrating aspects of the implementation of an embodiment of the inventive system and methods.

In some embodiments, the inventive system and methods for generating and updating metadata associated with a Website or webpage may consist of 3 primary tools or functional modules (such as one or more (sub)routines containing executable software instructions, which when executed by a programmed electronic processor, implement a process, method, operation, or function), where each tool provides a specific functionality for a different audience or user (as shown in FIG. 4(a)). These modules may include the following functional or operational capabilities:

Formula Definer

Figure 5:
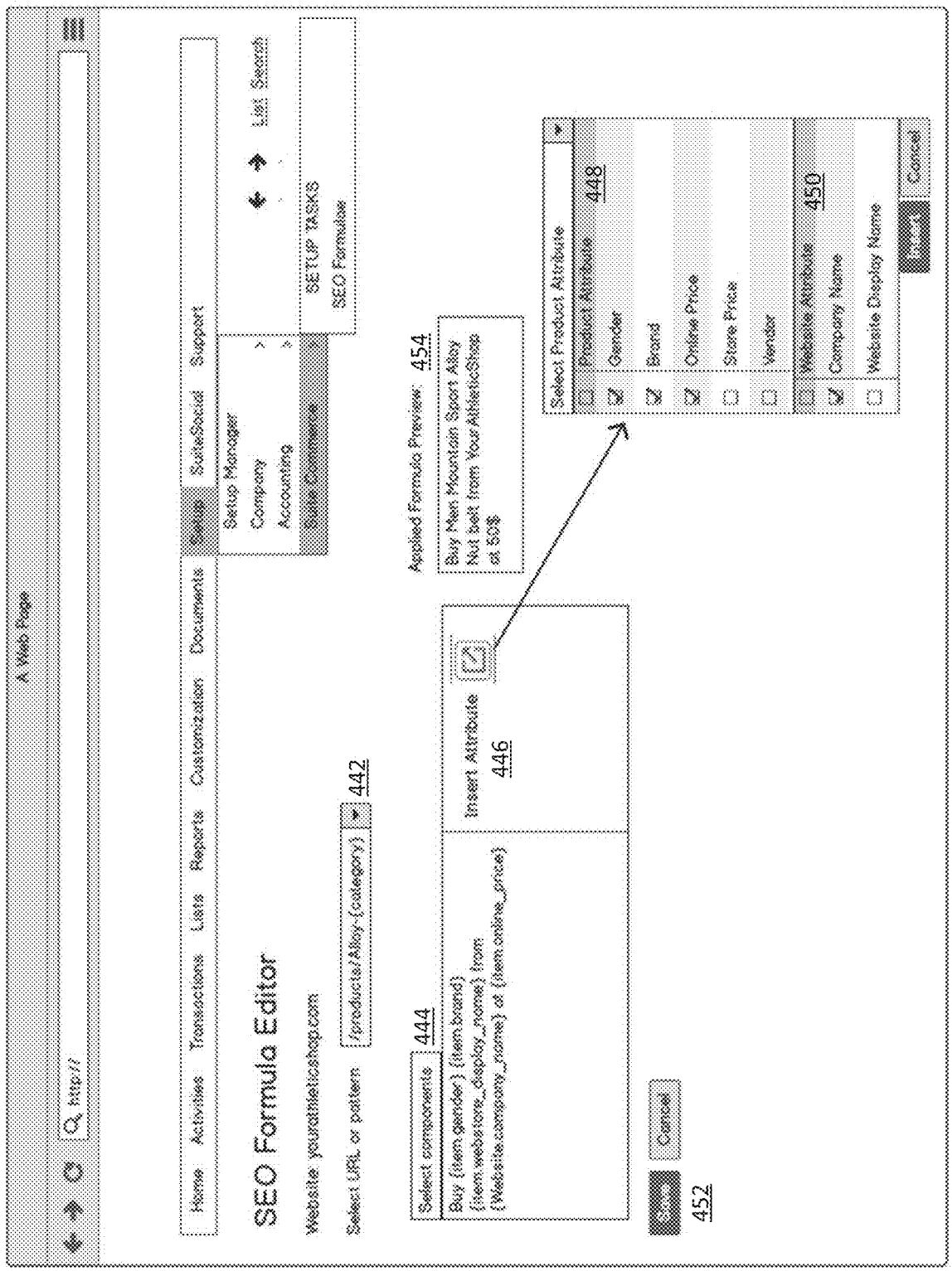
FIG. 5 is an example of a user interface (UI) that may be used for selecting attributes to a URL to define an SEO formula in an example embodiment of the inventive system and methods.

The metadata formula definer tool or functionality provides a Website administrator with the ability to select attributes, which can be used to define formulae for a metadata catalog for the Website. In some embodiments, the Website administrator may select which metadata formula is to be defined for the Website, and the formula is saved in data storage. For example, the metadata formula can be formed for a title, a meta description, meta keywords, or other html tag. Next, attributes in a Website catalog stored in a database may be selected to be included in the formula as parameters. The attributes may be selected using a User Interface (UI), such as shown in FIG. 5. The attributes for a Website may include, but are not limited to, a gender, formula definer tool or functionality provides a Website administrator with the ability to select attributes which can be used to define formulae for a metadata catalog for the Website. In one embodiment, when the metadata formula includes a metadata description, the administrator may include textual description in the formula. Examples of the meta description and associated formula may include (but are not limited to, or required to include):

TABLE 1

Formulae examples

| EXAMPLE | FORMULA | OUTPUT CONTENT |
| --- | --- | --- |
| ITEM PAGE METADESCRIPTION | Buy {item.gender} {item.brand} {item.webstore_display_name} from {Website.company_name} at {item.online_price} | Buy Men Mountain Sport Alloy Nut belt from YourAthleticShop at 50$ |
| HOME PAGE TITLE | Welcome to {website.company_name}-{website.tagline} | Welcome to YourAthletic Shop - the best store to buy online sporting goods |
| CATEGORY PAGE H1 | {category.item_count} {category.primary_parent} {category.name} at your disposal | 34 Men's Adidas Shoes at your disposal |

Formulae Evaluator

The formula evaluator tool or routine (e.g., set of executable software instructions) calculates or otherwise determines the value associated with the formulae for a Website and maintains the output of the evaluation in a cache, which is typically returned as a string or set of words. In an example of the operation of the inventive system and methods, a search engine user or Web crawler requests a Website or webpage. Such a request is generally received by a Web server and conveyed to an Application server. If there is no output for the request in the cache, then the formula evaluation function is implemented/triggered.

The evaluation process or function starts with retrieving information from the catalog regarding a product page that was requested. The product page is requested by a user based on an online search or by a Web crawler. The application server retrieves product information from the catalog, where the product information may include display name, stock keeping unit (sku), brand, online price, description, etc.

Then, each of the formulae definitions associated with each Website/webpage found by the search are retrieved by the application server and evaluated by substituting the product information gathered by the search with the appropriate formula parameters, which are defined earlier. In one embodiment, string substitution may be implemented using a suitable standard library, which provides this functionality, such as Java String Formatter:

```
String formula_template = "Buy online %1$s %2$s %3$s from %4$s at %5$s%6$.2f";
%1$s → String gender = "Man";
%2$s → String brand = "Mountain Sport";
%3$s → String display_name = "Alloy Nut belt";
%4$s → String company_name = "Your Athletic Shop";
%5$s → String currency_symbol = "$";
%6$s → Price = 50.0;
String subtituted = String.format(formula_template, gender, brand, display_name, company_name, currency_symbol, price);
```

With the previous example, the output of the substitution may be presented as: "Buy Men Mountain Sport Alloy Nut belt from YouAthleticShop at $50."

The formula evaluator stores such an output in a cache of the system, where the cache is typically associated with the customer/user. Cache inputs may be maintained for a certain amount or "threshold" of time, varying from minutes to days (after which it is presumed that the data is stale or inaccurate). The threshold value may be set by the tenant based at least in part on consideration of several factors, including but not limited to, volatility of the information or metadata (the expected timeframe over which it may change), business constraints, an upcoming event, etc. In some embodiments, the threshold value may be determined by one or more of a set of rules or a formula that considers business related data, such as sales, sales velocity, revenue, etc. In some embodiments, the cache is invalidated when an attribute value changes as a result of the Formula Updater function. Note that in this example, a further product page output (or excerpt) for the Website can be described as:

```
<head>
<meta name="description" content="Buy Men Mountain Sport Alloy Nut belt from YourAthleticShop at 50$">
</head>
```

At the same time (or substantially the same), the obtained Website is provided from the Application server to the Web server, and the Web server provides the product page as metadata elements to the user or Web crawler.

Formula Updater

The metadata formula updater provides dynamic updates to the formula of the Website or webpage when the definition of the formula changes, i.e., when the website administrator (or an automated process) redefines the formula (or the current formula is altered as a result of a change in specific underlying data or relationships), thereby changing the attributes. In other words, the formula updater invalidates the caches for the formulae and call a new execution of the formula evaluation to store a new value. The examples of pseudocode can be described as:

If the formula was redefined
    Invalidate the cache on it
    Execute the formula evaluator on it
If an attribute changed
    Find all the formulae that use said attribute
    Iterate on every formulae found
    Invalidate the cache for each
    Execute the formula evaluator for each
Attribute Observer For each attribute associated with a formula, an attribute observer function or process may trigger a new execution of the formula evaluation when the value of any of the attributes involved in the formula definition changes. An attribute observer is assigned to each attribute used in a formula. The attribute observer monitors the value of the attribute it has assigned to and compares the value, which is originally assigned to, with the value of the attribute at the time of comparison. When the change in value of the attribute is detected, the formula updater is notified and invalidates the cache for the formula. Then, the attribute observer is executed to trigger an update of the formula. The execution can be implemented with an observer pattern, which can be languages used for web implementation in MV Architecture. For example, when a price of an item changes, the metadata needs to reflect the new price and is recalculated.

When the formula "Buy online %1$s %2$s %3$s from %4$s at %5$s %6$.2f" is created, an attribute observer for each attribute is created and attached to the attribute (%1$s, %2$s, %3$s . . . ). The Example can be described using JavaScript as:

```
var observer = {
  set(model, attribute, value) {
    // If the new value is different
    if(target[attribute] !== value)
    {
      // Notify the formula updater
      notifyUpdater(target[attribute]);
      model[attribute] = value;
    }
    // Else do nothing
  }
};
// setting new values to myProduct model will fire the notification
var myProduct = new Proxy(myProductData, observer);
]
```

In some embodiments, when a user makes a request, the Application server reviews the metadata of the Websites in the cache. If the Application server finds that there is no metadata output for a Website maintained in the cache, then the Application server requests the formula evaluator to calculate the appropriate formula to produce the metadata elements for the product page to be included to the response. The metadata elements are calculated using the formula for the Website to provide the dynamic metadata associated with the Website. The metadata elements may refer to the metadata header, but are not limited to <title,> and <meta name=description>. By the update on the metadata formula, the backend data of the Website remains the same; however, certain aspects of the webpage will be modified due to the use of the formula tools. For example, the Web site may not contain a page title but a valid page title can be returned based on the formula tool extracting information from the page and replaced the empty string with the valid title.

An example of one possible use case or implementation environment for an embodiment of the inventive system and methods is that of a multi-tenant system or data processing platform which supplies eCommerce and/or other search related functionality. This setting provides a useful example as such platforms store and process relatively large amounts of data for companies who are tenants of the platform. Tenant employees (such as employees of an eCommerce website operator) may desire to define formulae for their products and catalog so that their final customers may efficiently find the products when searching online. The underlying metadata and formulae that characterize a specific business' operations or products may be defined as a part of the multi-tenant system, where each formula may be individually defined by a tenant as part of their separate account and applied only to his/her customers. Similarly, embodiments of the inventive system and methods may be used in the context of an eCommerce platform operated by a single entity, or another service that relies on the generation and presentation of webpages and related content as part of offering products or services (such as to enable more efficient searches over data related to employees (HR or HCM), inventory (ERP), financial data, sales efforts (CRM), etc.).

A multi-tenant architecture provides a means for multiple accounts (tenants) and users to store and access their data, and to utilize specific applications that reside on a remote platform. The platform is typically implemented as a set of servers or server groups, and is administered and operated by another party that provides use of the platform infrastructure as a service to the accounts and each account's users. The inventive SEO formulae and metadata management system and methods described herein may be applied to each account separately and individually, and allows a tenant to define formulae based on their data, independent of the other tenants.

FIG. 1 is a diagram illustrating a system 100 in which an embodiment of the invention may be implemented. Website network 104 may be associated with a Website administrator, such as a retailer, merchant, service provider, or other types of business. Alternatively, and in accordance with the advantages of an application service provider (ASP) hosted integrated business system (such as a multi-tenant data processing platform), the Website administrators may comprise fewer or no dedicated facilities or business network at all, provided that its end users have access to an Internet browser and an Internet connection. For simplicity and clarity of explanation, the Website network 104 is represented by an on-site local area network 106 to which a plurality of personal computers 108 are connected, each generally dedicated to a particular end user, such as a service agent or other employee (although such dedication is not required), along with an exemplary remote user computer 110 that can be, for example, a laptop computer 110 or tablet computer of a traveling employee having Internet access through a public Wi-Fi access point, or other Internet access method. The end users (Website administrators) associated with computers 108 and 110 may possess an Internet-enabled smartphone or other electronic device (such as a PDA, tablet, laptop computer) having wireless Internet access or other synchronization capabilities. Users of the Website network 104 interface with the SEO system 102 across the Internet 112 or another suitable communications network or combination of networks.

SEO system 102, which may be hosted by a dedicated third party, such as a search engine provider, may include an SEO server 114 and a Web server 116, coupled as shown in FIG. 1. It is to be appreciated that either or both of the SEO server 114 and the web server 116 may be implemented on one or more different hardware systems and components communicating with standard protocols such as HTTP(s)/TCP, even though represented as singular units in FIG. 1. In another example, SEO system 102 may be part of or coupled to one or more of an ERP, CRM, HR, or eCommerce application that is made available to tenant users of a multi-tenant platform or system.

In a typical example in which system 102 is operated by a third party for the benefit of multiple account owners/tenants, each of whom is operating a business, SEO server 114 comprises a formula building module 118 that will treat each tenant's information separately, metadata elements module 120, text module 122, catalog (product page) module 124, formula evaluating module 126, cache checking module 128, and substitution module 130. Web server 116 is configured and adapted to interface with the SEO server 114 to provide one or more web-based user interfaces to end users of the Website network 104.

The SEO system 102 shown in FIG. 1 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is most often a combination of hardware and the software that helps deliver content, commonly by hosting a website, to client web browsers that access the web server via the Internet.

Note that although parts of the description herein discuss using an embodiment of the inventive system and methods in the context of an eCommerce platform and the associated product data (such as brand, sizing, pricing, inventory, etc.), the inventive methods may be applied to maintain metadata associated with other systems or applications as well. For example, metadata used to define the arrangement of content on a webpage or a characteristic of a website may be subject to change based on marketing or organizational communications strategies; an embodiment of the inventive methods may be used in such an environment where those strategies depend to some extent on (or are in some manner determined by) the underlying business data of the organization. This may occur, for example, when a change in business data or the data exceeding some threshold value is desired to cause a change to the content displayed or how content is displayed on a webpage or website (such as if revenue, products sold, employee count, patents awarded, deals closed, funds raised, etc. reach a pre-determined value).

In general, the applications that reside on such a multi-tenant platform may be used to process certain of a tenant or user's data by instantiating an occurrence of a desired application within the account; for these types of uses, the applications may include ones utilized to operate a business, such as an eCommerce application, ERP (for inventory management), CRM (for sales opportunity management), HCM (for personnel management), or a financial data processing application. Tenant customizations to the operation of the architecture may include custom functionality (such as the capability to perform tenant or user-specific functions, workflows, data processing, or operations) built on top of lower level operating system functions. In general, a multi-tenant platform or service may provide data storage, computational processing power, data analytics, and applications or workflows that may be executed with reference to an account's data (in whole or in part, and account-wide or user-specific). In some cases, such services have been described as Software-as-a-Service (SaaS), cloud-based services, web-services, or remote services.

The ERP module may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module may include, but is not limited to, a sales force automation (SFA) module, a marketing automation module, a contact list module (not shown), a call center support module, a web-based customer support module, a reporting and analysis module, and other CRM-related modules. The integrated business server (or multi-tenant data processing platform) further may provide other business functionalities including a web store/eCommerce module, a partner and vendor management module, and an integrated reporting module. An SCM (supply chain management) module and PLM (product lifecycle management) module may also be provided. A web interface server may be configured and adapted to interface with the integrated business server to provide one or more web-based user interfaces to end users of the enterprise network.

Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

Figure 2:
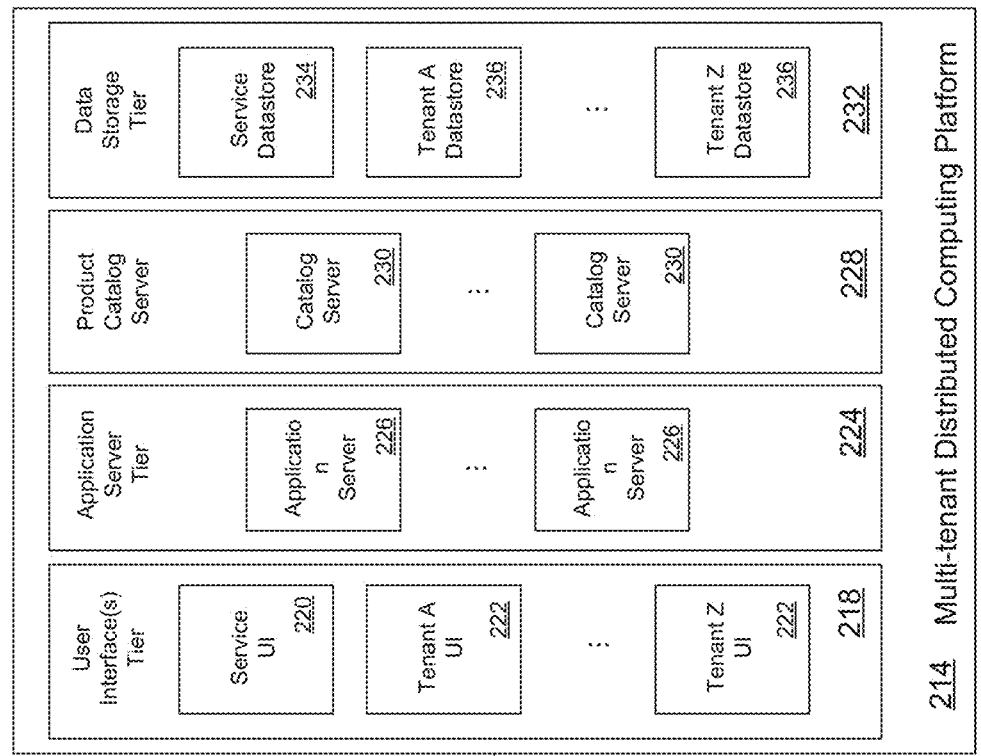
FIG. 2 is a diagram illustrating elements or components of an example operating environment in which an embodiment of the invention may be implemented.
Figure 2:
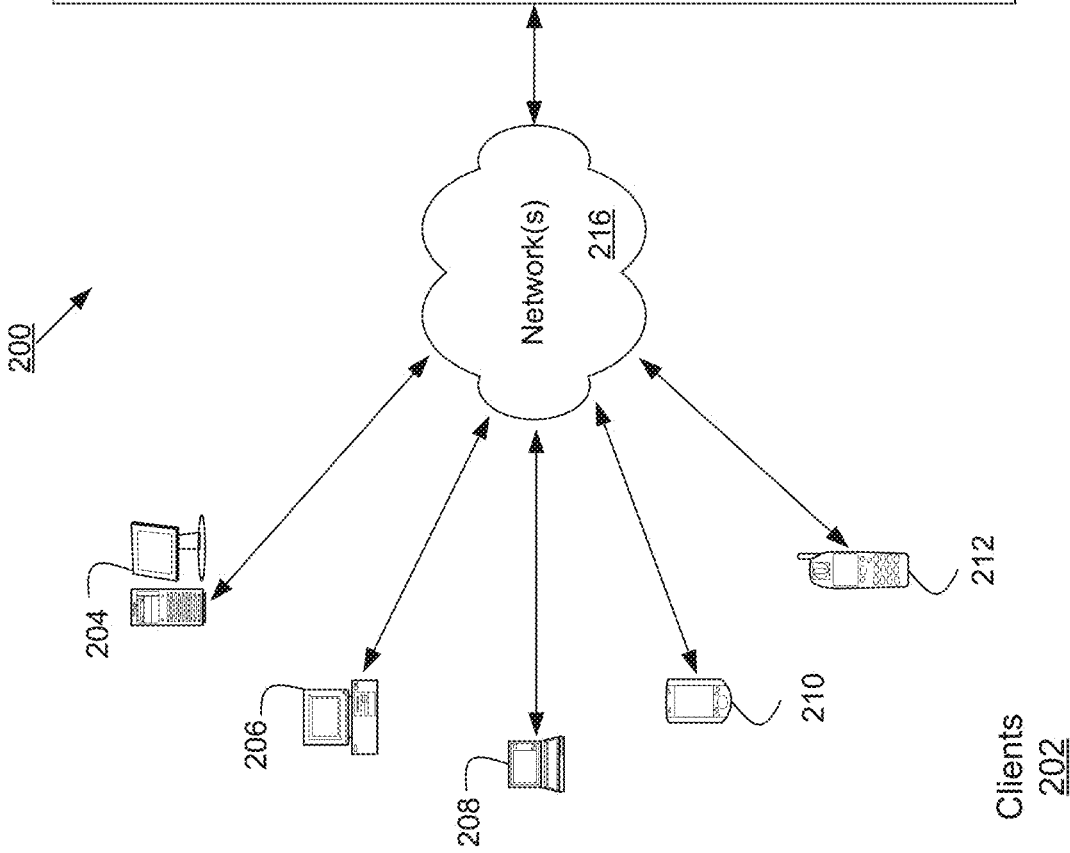

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 214 through one or more networks 216. For example, a client may incorporate and/or be incorporated into a client application (e.g., software) implemented at least in part by one or more of the computing devices. Examples of suitable computing devices include personal computers, server computers 204, desktop computers 206, laptop computers or notebook computers 208, tablet computers or personal digital assistants (PDAs) 210, smart phones and cell phones 212, and consumer electronic devices incorporating one or more computing device components, such as one or more electronic processors, microprocessors, central processing units (CPU), or controllers. Examples of suitable networks 216 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 214 may include multiple processing tiers, including a user interface tier 218, an application server tier 224, a product catalog server 228, and a data storage tier 232. The user interface tier 218 may maintain multiple user interfaces 220, 222, including graphical user interfaces and/or web-based interfaces. The user interfaces may include a default user interface for the service to provide access to applications and data for a user or "tenant" of the service (depicted as "Service UI" 220 in the figure), as well as one or more user interfaces that have been specialized/customized in accordance with user specific requirements (e.g., represented by "Tenant A UI", . . . , "Tenant Z UI" 222 in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 232 may include one or more data stores, which may include a Service Data store 234 and one or more Tenant Data stores 236.

Each tenant data store 236 may contain tenant-specific data that is used as part of providing a range of tenant-specific business services or functions, including but not limited to eCommerce. Data stores may be implemented with any suitable data storage technology, including structured query language (SQL) based relational database management systems (RDBMS).

In accordance with one embodiment of the invention, distributed computing service/platform 214 may be multi-tenant and service platform 214 may be operated by an entity in order to provide multiple tenants with a set of business related applications, data storage, and functionality. These applications and functionality may include ones that a search engine provider uses to optimize search results of Websites. For example, the applications and functionality may include providing web-based management of Websites, thereby allowing a user with a browser and an Internet or intranet connection to view, enter, process, or modify certain types of Website SEO information for search engines.

As noted, such Website SEO systems may generate formulae for each Website and optimize search results of search engines by optimizing and/or updating the metadata or formula, in accordance with an embodiment of the inventive system and methods. By way of example, the capabilities or modules of a Website SEO system may include (but are not required to include, nor limited to only including): building and evaluating formulae, adding metadata elements and text, checking catalogs (product webpages) and a cache, and substituting formulae. Such functions or business applications are typically implemented by one or more modules of software code/instructions that are maintained on and executed by one or more servers 226 that are part of the platform's Application Server Tier 224. In addition, catalogs and product webpages can be maintained by one or more servers 230 that are part of the platform's Product Catalog Server 228.

Note that functional advantages and strategic advantages may be gained through the use of the Website SEO system, as for example where the Website SEO system is integrated with a merchant's eCommerce platform and/or "web-store." For example, a Website administrator may maintain and manage a Website for a merchant with a wide array of product and/or services. When the administrator initiates an update to any of the information regarding the product or the service via a browser-based interface, the Website SEO system can initiate a process for the automatic update of a formula for the Website. These modules and other applications and functionalities may advantageously be executed by the formula accessing one or more catalog databases as necessary, forming a Website SEO management system or platform (such as platform 214 of FIG. 2).

Further, both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as the data processing platform of FIG. 2).

As noted with regard to FIG. 1, the Website SEO system shown in FIG. 2 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such a Website SEO system themselves, a business may utilize systems provided by a third party. Such a third party may implement a Website SEO system/platform as described above in the context of a multi-tenant platform, wherein individual instantiations of a single comprehensive Website SEO system are provided to a variety of tenants. One advantage to such multi-tenant platforms is the ability for each tenant to customize their instantiation of the Website SEO system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases such an extension may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 3:
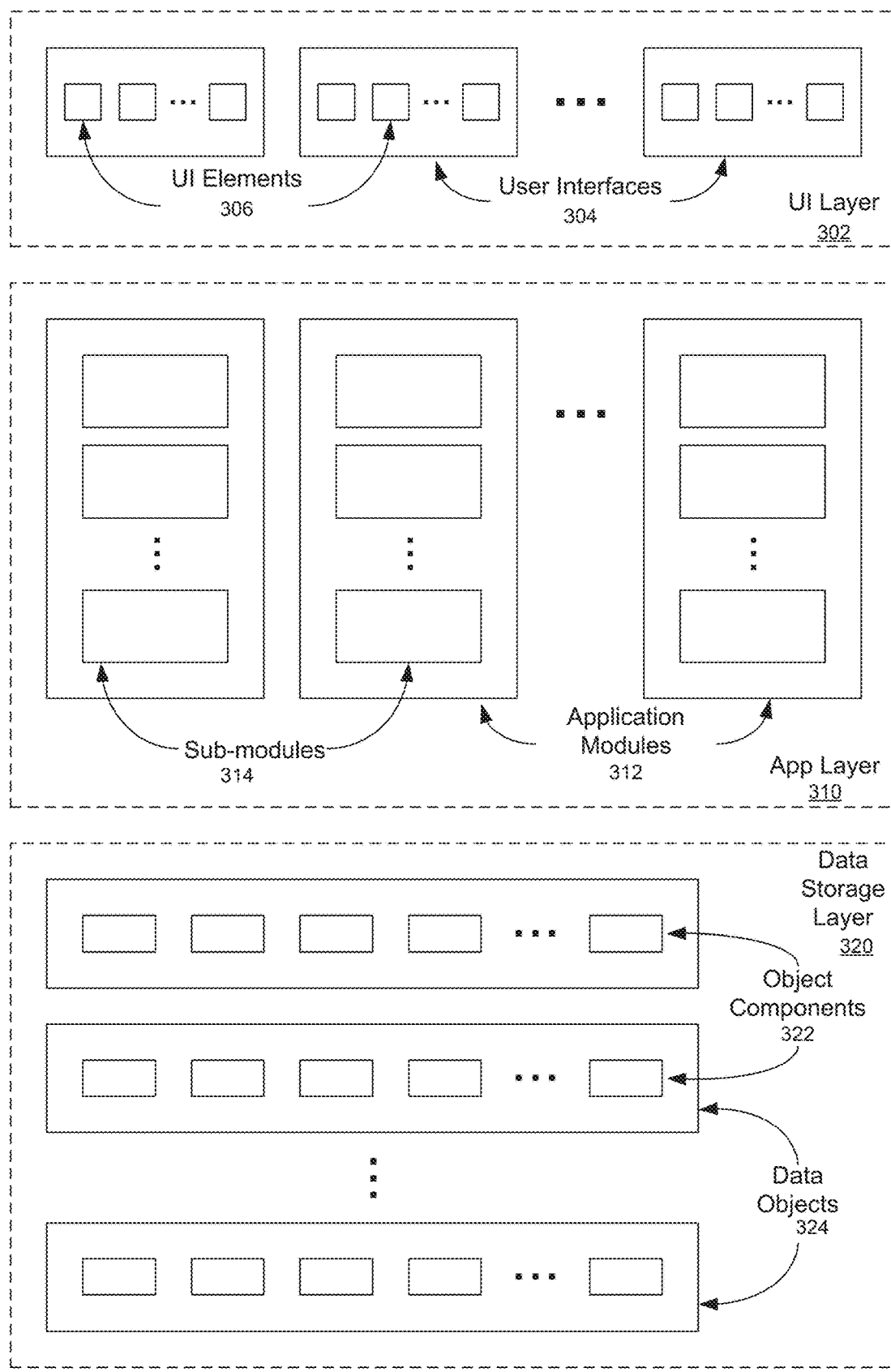
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 304. Examples of such user interfaces include graphical user interfaces and application programming interfaces (APIs). Each user interface may include one or more interface elements 306. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 312, each having one or more sub-modules 314. Each application module 312 or sub-module 314 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods (e.g., generating a user interface that permits a user to perform one or more of the operations or manipulations described herein, such as for defining metadata with formulae for a Website and automatically updating the formulae based on updates to the Website, etc.).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 226 of FIG. 2) may include each application module. Alternatively, different application servers may include different sets of application modules. Such sets may be disjointed or overlapping.

The data storage layer 320 may include one or more data objects 324 each having one or more data object components 322, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjointed or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user.

FIG. 4(a) is a flow chart illustrating aspects of the implementation of an embodiment of the inventive system and methods 400 in accordance with an embodiment of the invention. A Website administrator may be provided a metadata formula (typically by a tenant or business representative) that is based on one or more attributes. Once the selection of attributes is made (step 402), a formula for the Website is defined (step 404). When a searcher or user requests a Website with product information, the search request is received by the Web server (step 406). Then, the Web server checks if there is a cached output for that product (step 407) and retrieves the stored metadata of a previous evaluation of the formulae for that request (step 409). If there is no cached metadata for the request, then the product information is retrieved from a catalog (step 408). Note that unless the search request is received, the step 408 is not triggered to evaluate the formula. Then, the formula defined and associated with each Website is retrieved and evaluated (step 410). The output of the formula is stored (step 414) for any further search requests made (step 406) and the process is repeated to update the formula based on the current Website information. The output is then provided to the searcher (step 412).

Figure 4B:
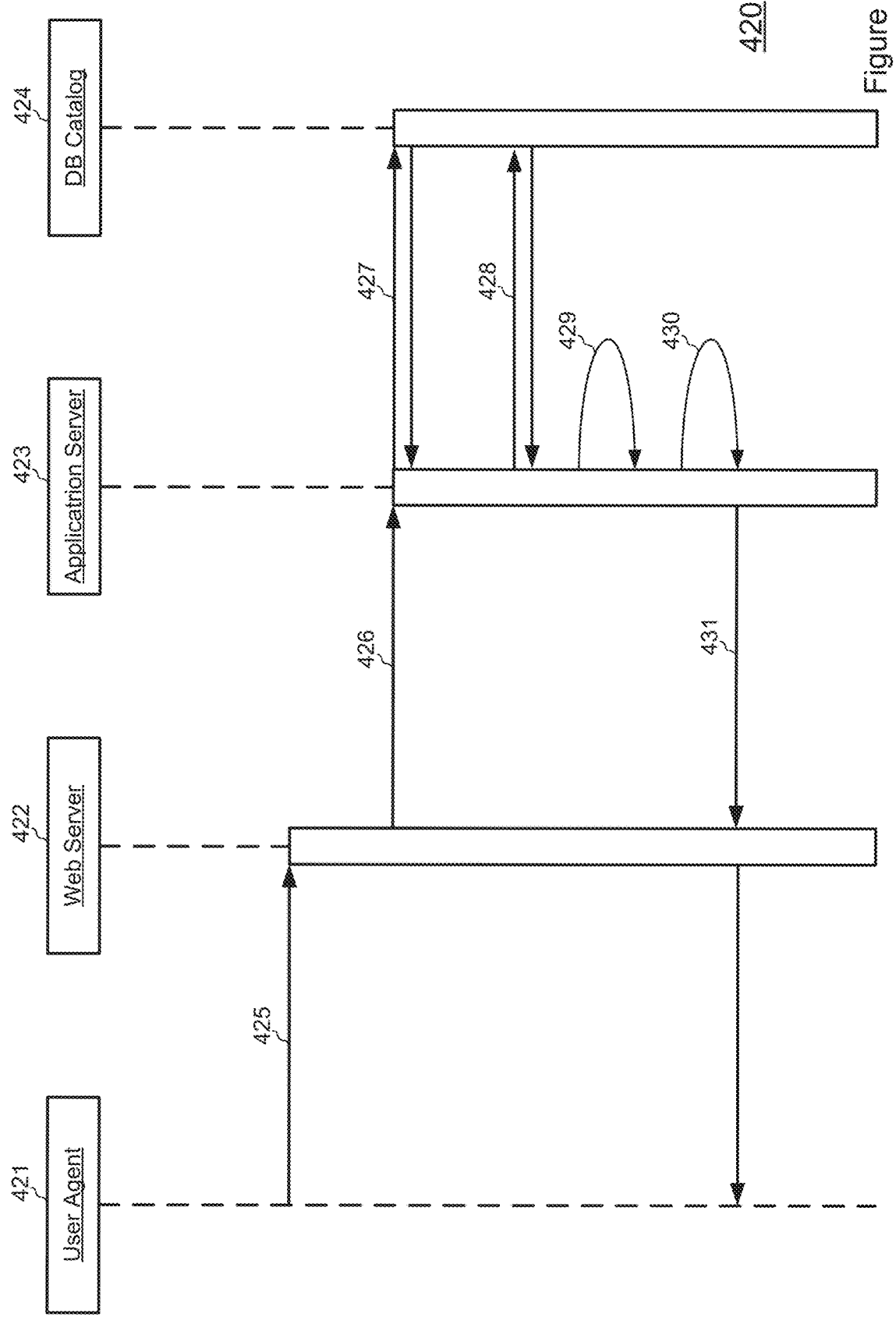
FIG. 4(b) is a sequence diagram illustrating a search request process.

FIG. 4(b) is a sequence diagram of the process implemented in whole or in part by an embodiment of the inventive system and methods after receiving a search request from a user or web crawler. A user agent 421 requests a webpage to retrieve a product page (step 425). The Web server 422 receives the request and forwards it to an application server 423 (step 426), which in time queries the catalog (step 427) for product information and formula definition (step 428). Then, the application server 423 evaluates the formula to obtain the new metadata values (step 429) and prepares the webpage content, which includes the metadata (step 430). The webpage is then returned to the user by the Web server (step 431).

FIG. 5 is an example UI 440 for selecting attributes to a URL to define an SEO formula. The UI 440 may be provided to a Website administrator to first select a URL or pattern from a pull-down 442 for adding attributes. Then, the Website administrator may select each component 444 to add attributes 446, such as from product attributes 448 and Website attributes 450, and save the selected attributes 452. In this example UI 440, by selecting the attributes 448, 450, the Website administrator may be able to preview 454 the applied formula for review.

Figure 6:
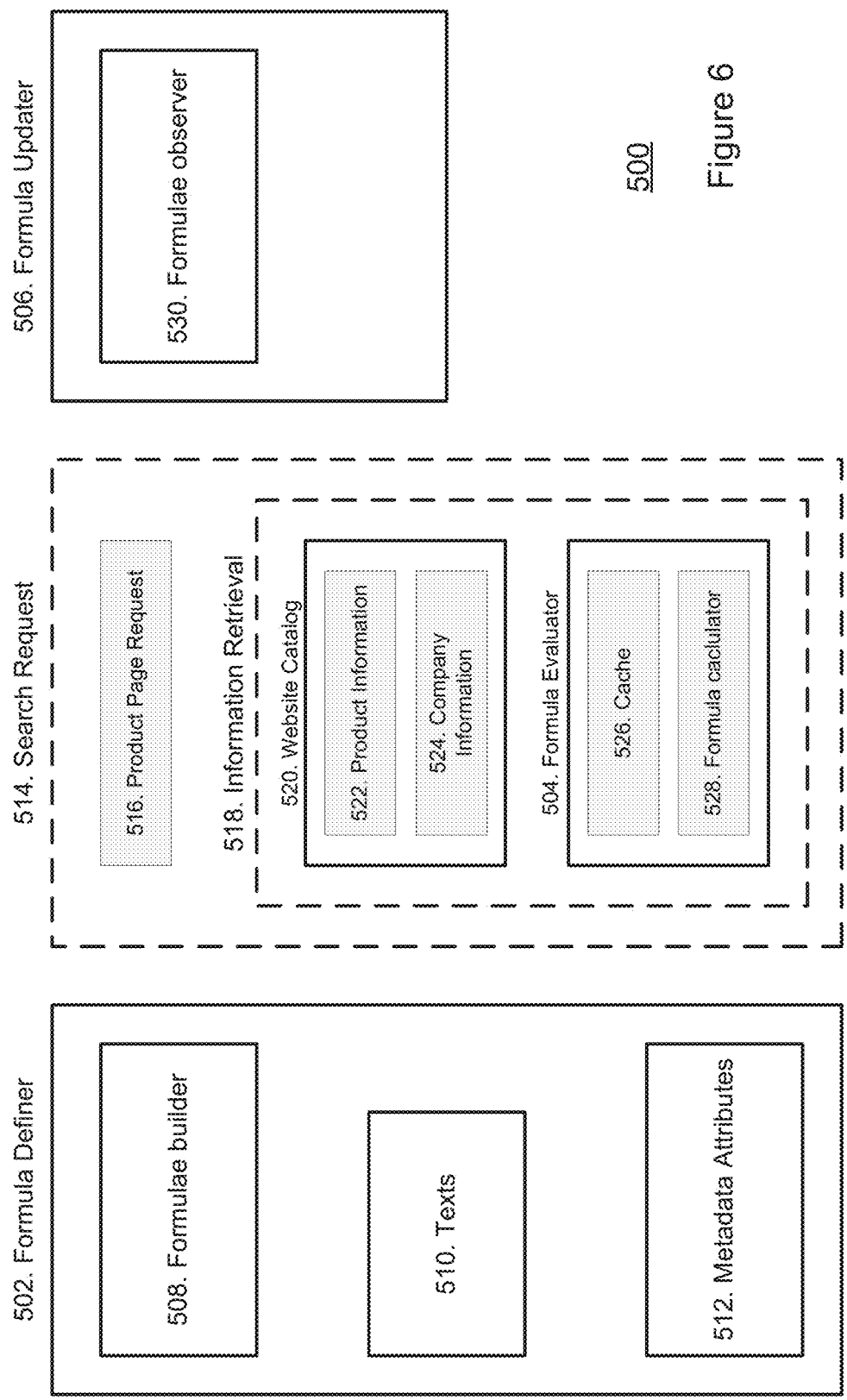
FIG. 6 is a diagram illustrating aspects of the implementation of an embodiment of the inventive system and methods, including certain functional modules or operations that may be used in implementing the embodiment.

FIG. 6 is a diagram illustrating aspects of the implementation of an embodiment of the inventive system and methods with certain functional modules or operations that may be used in implementing the embodiment. There are three primary functionalities or operations that may be implemented in accordance with an embodiment with the invention: formula definer 502, formula evaluator 504, and formula updater 506. The formula definer 502 provides a user interface to build a formula 508 for a Website based on attributes in a product catalog 522, or using tenant company information 524 and further provides texts 510 and additional metadata elements 512 to add to the formula. When a search request is received 514, a product page of the Website is requested 516 and retrieval of the product information in a Website catalog occurs 518. The formula evaluator checks if the result of evaluating the formula associated with the Website is still valid 526. When the formulae results are stale or not present, the formulae are recalculated 528. As a result of the evaluation, the cache is updated 526. Moreover, for each defined formula, an observer 530 becomes associated with each attribute in the formula so that if it changes, then the formula updater 506 is notified, invalidates the cache 522, and calls the formula evaluator 504 for updating the results.

Figure 7:
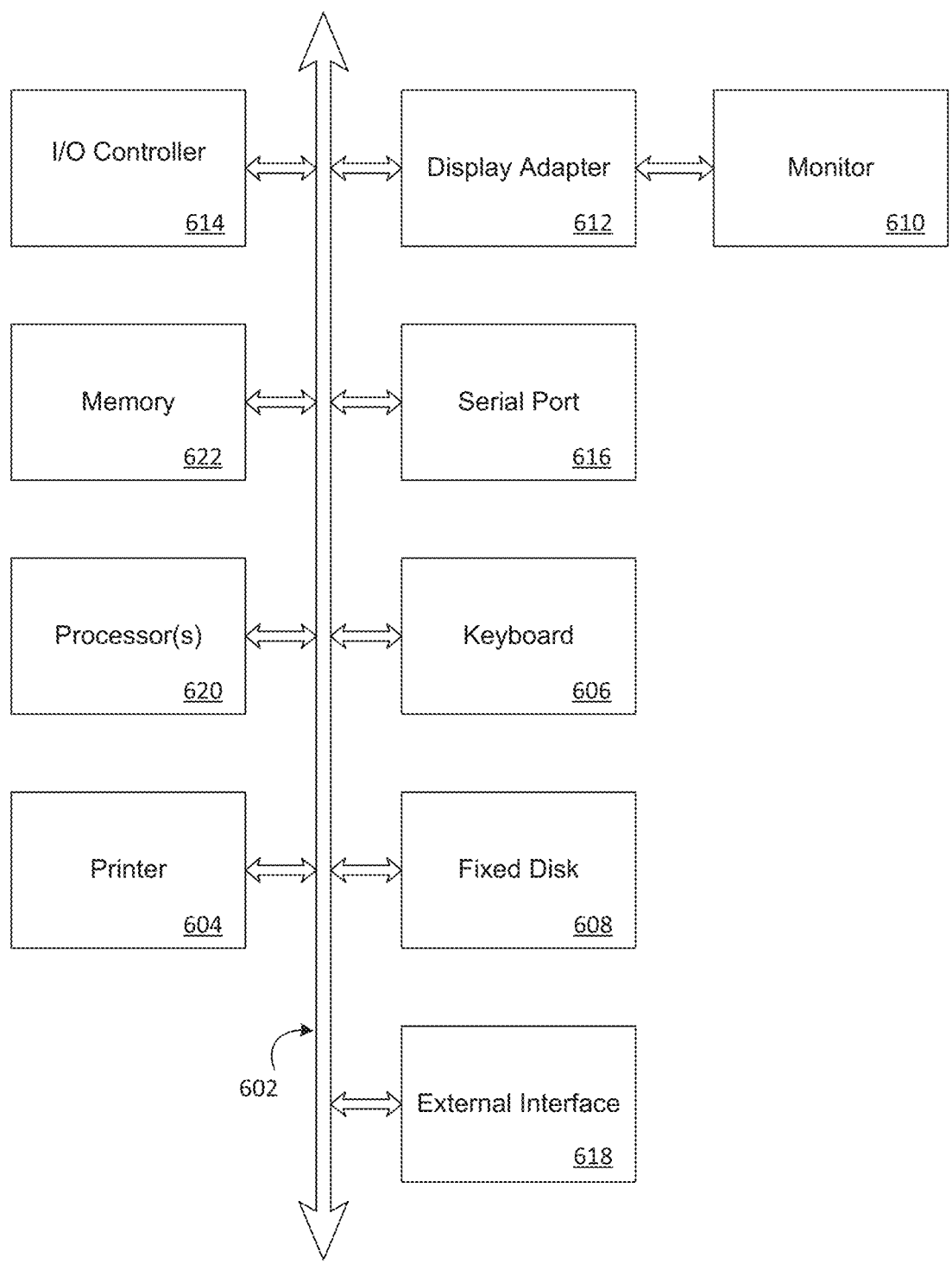
FIG. 7 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for efficiently generating and managing the contents of a metadata catalog may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 7 is a diagram illustrating elements or components that may be present in a computer device or system 600 configured to implement a method, process, function, or operation in accordance with an embodiment of the invention. The subsystems shown in FIG. 7 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for creating an automatically updatable Website metadata catalog, wherein the method is performed by a computing device which includes at least a processor for executing instructions from a memory, the method comprising steps of:
    providing, by a processor, a Website having an updatable Website metadata catalog, wherein the updatable Website metadata catalog includes a plurality of metadata formulas associated with the Website;
    generating, by the processor, a graphical user interface on a display screen, wherein the graphical user interface is associated with updating the updatable Website metadata catalog;
    in response to a user interaction with the graphical user interface, defining, by the user, operating parameters of each metadata formula of the plurality of metadata formulas and storing, by the processor, the metadata formulas in a database communicatively connected to the processor, wherein the operating parameters include one or more attributes of the Website defined by the user;
    calculating an output value of one or more of the metadata formulas associated with the Website, wherein the calculated output value is maintained in a cache memory for a threshold of time set by an administrator of the Website;
    assigning, by the processor, an attribute observer to each attribute of the one or more attributes, wherein the attribute observer monitors a change in a value of the one or more attributes of the Website;
    receiving a search request for the Website via a search engine through a Web server; and
    in response to receiving the search request for the Website, automatically updating, by the processor, the metadata formulas for the Website catalog, wherein the automatic updating comprises steps of:
        retrieving each metadata formula of the metadata formulas associated with the Website from the database;
        determining if one or more of the attributes of at least one of the metadata formulas has experienced a change in value;
        in response to the determining that the one or more of the attributes of at least one of the metadata formulas has changed in value, automatically updating the metadata formulas having the one or more attributes that have changed in value using the change in the value of the one or more attributes of the Website, and
        storing the updated metadata formulas for the Website in the cache memory.

2. The method of claim 1, further comprising substituting one or more of the parameters with the at least one of the attributes if there is a discrepancy between one or more of the parameters and the at least one of the attributes.

3. The method of claim 1, further comprising invalidating the calculated value when the threshold of time is passed.

4. The method of claim 1, further comprising:
    determining that no metadata formula associated with the Website is stored in the database;
    generating a metadata formula associated with the Website based on the attributes of the Website; and
    storing the generated metadata formula in the database.

5. The method of claim 1, wherein the metadata formula is formed for at least one of the group comprised of: a title, meta description, meta keywords, and Hyper Text Markup Language (HTML) tags for the Website.

6. The method of claim 1, wherein the attributes comprise at least one of the group comprised of: a category, facet structure, class, item description, and page type.

7. The method of claim 1, further comprising integrating the method with a business system accessible by a plurality of tenants of a multi-tenant data processing system to update one or more business related data based on the metadata formula.

8. The method of claim 7, wherein the business system comprises at least one group comprised of: Enterprise Resource Planning (ERP), Human Capital Management (HCM), and Customer Relationship Management (CRM).

9. A Website metadata catalog automatic updating system, comprising:
    a memory including instructions stored therein; and
    a computing device having a processor electrically connected with a communication network and with the memory, wherein the processor is configured to execute the instructions from the memory, wherein the processor is operatively connected to:
        an application server configured with a graphical user interface to define a metadata formula for a Website using parameters that are associated with one or more attributes of the Website, and configured to assign an attribute observer to each attribute of the one or more attributes, wherein the attribute observer monitors a change in a value of the one or more attributes of the Website;

a database communicatively connected to the application server configured to store the metadata formula;

a Web server configured to receive a search request for the Website via a search engine and to evaluate Website crawler; and a search engine optimization server configured to perform an automatic updating process of the metadata formula associated to the Website, wherein the automatic updating process comprises:

(a) retrieving the metadata formula associated to the Website from the database, and calculate an output value of the metadata formula associated with the Website, wherein the calculated output value is maintained in a cache memory for a threshold of time set by an administrator of the Website;

(b) determining if one or more of the attributes of the metadata formula has experienced a change in value;

(c) in response to the determining that the one or more of the attributes of the metadata formula has changed in value, automatically updating the metadata formula having the one or more attributes that have changed in value using the change in the value of the one or more attributes of the Website; and (d) storing the updated metadata formula for the Website in the cache memory.

10. The system of claim 9, wherein the automatically updating step further comprises retrieving product information of the Website corresponding to each parameter of the parameters from the metadata formula and comparing the parameters with the corresponding product information to see if there is discrepancy.

11. The system of claim 10, wherein the automatically updating step further comprises substituting one or more of the parameters to the corresponding product information to update if there is discrepancy between one or more of the parameters and the corresponding product information.

12. The system of claim 9, wherein the retrieving step further comprises:

determining that no metadata formula associated to the Website is stored in the database;

generating a metadata formula associated to the Website based on the product information of the Website; and caching the generated metadata formula to the database.

13. The system of claim 9, wherein the metadata formula is formed for at least one of the group comprised of: a title, meta description, meta keywords, and Hyper Text Markup Language (HTML) tags for the Website.

14. The system of claim 9, wherein the metadata formula comprises product information corresponding to attributes of the Website.

15. The system of claim 14, wherein the attributes comprise at least one of the groups comprised of: a category, facet structure, class, item description, and page type.

16. The system of claim 9, further comprising:

a business system communicatively configured to the application server accessible by a plurality of tenants of a multi-tenant data processing system configured to update one or more business related data based on the metadata formula.

17. A non-transitory computer readable medium containing program instructions for creating an automatically updatable Website metadata catalog, wherein execution of the program instructions by one or more processors of a computer system causes the one or more processors to carry out steps of:

a) providing, by the processor, a Website having an updatable Website metadata catalog, wherein the updatable Website metadata catalog includes a plurality of metadata formulas associated with the Website;

b) generating, by the processor, a graphical user interface on a display screen, wherein the graphical user interface is associated with updating the updatable Website metadata catalog;

c) in response to a user interaction with the graphical user interface, defining, by the user, operating parameters of each metadata formula of the plurality of metadata formulas and storing, by the processor, the metadata formulas in a database communicatively connected to the processor, wherein the operating parameters include one or more attributes of the Website defined by the user;

d) calculating an output value of one or more of the metadata formulas associated with the Website, wherein the calculated output value is maintained in a cache memory for a threshold of time set by an administrator of the Website;

e) assigning, by the processor, an attribute observer to each attribute of the one or more attributes, wherein the attribute observer monitors a change in a value of the one or more attributes of the Website;

f) receiving a search request for the Website via a search engine through a Web server; and g) in response to receiving the search request for the Website, automatically updating, by the processor, the metadata formulas for the Website catalog, wherein the automatic updating comprises the steps of:

i) retrieving each metadata formula of the metadata formulas associated with the Website from the database;

ii) determining if one or more of the attributes of at least one of the metadata formulas has experienced a change in value;

iii) in response to the determining that the one or more of the attributes of at least one of the metadata formulas has changed in value, automatically updating the metadata formulas having the one or more attributes that have changed in value using the change in the value of the one or more attributes of the Website; and iv) storing the updated metadata formulas for the Website in a cache memory.

* * * * *